US006879893B2

(12) United States Patent
Woodard et al.

(10) Patent No.: US 6,879,893 B2
(45) Date of Patent: Apr. 12, 2005

(54) TRIBUTARY ANALYSIS MONITORING SYSTEM

(75) Inventors: Stanley E. Woodard, Hampton, VA (US); Neil C. Coffey, Hampton, VA (US); Bryant D. Taylor, Smithfield, VA (US); Keith L. Woodman, Yorktown, VA (US)

(73) Assignee: The United States of America as represented by the Administrator of the National Aeronautics and Space Administration, Washington, DC (US)

(*) Notice: Subject to any disclaimer, the term of this patent is extended or adjusted under 35 U.S.C. 154(b) by 0 days.

(21) Appl. No.: 10/675,502

(22) Filed: Sep. 30, 2003

(65) Prior Publication Data

US 2004/0078125 A1 Apr. 22, 2004

Related U.S. Application Data

(60) Provisional application No. 60/411,012, filed on Sep. 30, 2002.

(51) Int. Cl.[7] ............................................ G01M 17/00
(52) U.S. Cl. ............................ 701/29; 701/33; 701/34
(58) Field of Search .................................... 701/29–34

(56) References Cited

U.S. PATENT DOCUMENTS

| | | | | |
|---|---|---|---|---|
| 5,452,465 | A | | 9/1995 | Geller et al. |
| 5,815,071 | A | | 9/1998 | Doyle |
| 5,917,428 | A | | 6/1999 | Discenzo et al. |
| 6,070,111 | A | | 5/2000 | Takakura et al. |
| 6,101,433 | A | | 8/2000 | Flicker, Jr. |
| 6,226,572 | B1 | | 5/2001 | Tojima et al. |
| 6,377,876 | B1 | | 4/2002 | Hedeen et al. |
| 6,609,051 | B2 | * | 8/2003 | Fiechter et al. ............... 701/33 |
| 6,718,238 | B1 | * | 4/2004 | Laguer-Diaz et al. ......... 701/33 |
| 2002/0016654 | A1 | | 2/2002 | Ing et al. |
| 2002/0032511 | A1 | | 3/2002 | Murakami et al. |
| 2002/0041240 | A1 | | 4/2002 | Ikeda et al. |
| 2002/0045976 | A1 | | 4/2002 | Kodama |

OTHER PUBLICATIONS

Stanley E. Woodard & Richard S. Pappa, "Development of Structural Identification Accuracy Indicators Using Fuzzy Logic," Proceeding of DETC'97, p. 1–6.

Stanley E. Woodard & Devendra P. Garg, "A Numerical Optimization Approach for Tuning Fuzzy Logic Controllers," IEEE Transactions , IEEE, vol. 29( No. 4), p. 565–569, no date.

* cited by examiner

*Primary Examiner*—Yonel Beaulieu
(74) *Attorney, Agent, or Firm*—Robin W. Edwards

(57) ABSTRACT

A monitoring system for a fleet of vehicles includes at least one data acquisition and analysis module (DAAM) mounted on each vehicle in the fleet, a control module on each vehicle in communication with each DAAM, and terminal module located remotely with respect to the vehicles in the fleet. Each DAAM collects/analyzes sensor data to generate analysis results that identify the state of a plurality of systems of the vehicle. Each vehicle's control module collects/analyzes the analysis results from each onboard DAAM to generate vehicle status results that identify potential sources of vehicle anomalies. The terminal module collects/analyzes the analysis results and vehicle status results transmitted from each control module from the fleet of vehicles to identify multiple occurrences of vehicle anomalies and multiple occurrences of those vehicle systems operating at a performance level that is unacceptable. Results of the terminal module's analysis are provided to organizations responsible for the operation, maintenance and manufacturing of the vehicles in the fleet as well as the plurality of systems used in the fleet.

77 Claims, 5 Drawing Sheets

| RULE NO. | A | B | C | D |
|---|---|---|---|---|
| 1 | S | S | S | S |
| 2 | S | S | M | S |
| 3 | S | S | L | L |
| 4 | S | L | S | L |
| 5 | S | L | M | L |
| 6 | S | L | L | L |
| 7 | L | L | S | L |
| 8 | L | L | M | L |
| 9 | L | L | L | L |

TRIBUTARY ANALYSIS MONITORING SYSTEM

CLAIM OF BENEFIT OF PROVISIONAL APPLICATION

Pursuant to 35 U.S.C. § 119, the benefit of priority from provisional application U.S. Ser. No. 60/411,012, with a filing date of Sep. 30, 2002, is claimed for this non-provisional application.

ORIGIN OF THE INVENTION

This invention was jointly made by employees of the United States Government and a contract employee during the performance of work under a NASA contract which is subject to the provisions of Public Law 95–517 (35 USC 202) in which the contractor has elected not to retain title and may be manufactured and used by or for the government for governmental purposes without the payment of royalties thereon or therefor.

BACKGROUND OF THE INVENTION

1. Field of the Invention

This invention relates to automated and autonomous monitoring systems. More specifically, the invention is an automated and autonomous monitoring system that i) performs data collection and analysis thereof at various data collection nodes onboard each vehicle in a fleet, ii) passes analysis results up to an onboard vehicle terminal and then on to a fleet-wide terminal for further analysis processing, and iii) notifies interested parties of problems with individual vehicles and fleet-wide problems (e.g., related to vehicle usage, maintenance, performance, damage or degradation) indicated by the analysis results.

2. Description of the Related Art

Monitoring the performance of mechanical or structural systems is increasingly being accomplished with automated systems that collect performance data and present same to a user for analysis. The collected performance data can be related to system usage, maintenance, damage or degradation. Data collection typically requires specifically-designed data sensing and collecting hardware that must be integrated into the particular system being monitored. As a result, there is a great deal of time and expense associated with such application specific designs. Data presentation can come in the form of “data versus time” or “data versus other key parameter variation” plots, alarm notifications when a particular monitored sub-system’s upper or lower threshold is reached, and/or large blocks of raw sensor data which must be collected, stored and analyzed at some later time. However, the value of such presentation is limited. While notification alarms present a form of real-time data analysis, the alarm generally relates to an individual sub-system’s performance without considering how this might be indicative of a broader system problem. On the other hand, if data is presented in the form of blocks of data or plots of data, analysis thereof must take place “off line” at some point later in time. Furthermore, such analysis is performed manually, thereby requiring personnel to do so.

The above-described problems associated with current performance monitoring systems are further exacerbated when the performance of a number of similar systems is to be monitored. For example, it would be desirable to monitor fleets of vehicles (e.g., aircrafts, ground vehicles, underwater vehicles, etc.) that utilize identical or similar sub-systems in order to determine if there is a fleet-wide problem.

However, using current technology, data from individual vehicles in the fleet would have to be collected and then analyzed for problematic trends. Such analysis may be too little or too late to prevent a catastrophic system failure.

SUMMARY OF THE INVENTION

Accordingly, it is an object of the present invention to provide an architecture for autonomously monitoring a group of identical or similar systems such as a fleet of vehicles.

Another object of the present invention is to provide a monitoring system that can be adapted to work with a variety of systems to be monitored.

Yet another object of the present invention is to provide a monitoring system that can collect and analyze performance data related to each vehicle in a fleet of such vehicles in order to provide an indication of possible fleet-wide problems, and then automatically notify interested parties of such fleet-wide problems as well as any problems with individual vehicles.

Other objects and advantages of the present invention will become more obvious hereinafter in the specification and drawings.

In accordance with the present invention, a monitoring system for a fleet of vehicles includes at least one data acquisition and analysis module (DAAM) mounted on each vehicle in the fleet. Each DAAM i) collects data indicative of measurable attributes of the vehicle, ii) analyzes the data to generate analysis results that identify the state of a plurality of systems of the vehicle based on the measurable attributes, and iii) transmits at least a portion of the analysis results. A control module is mounted on each vehicle and is in communication with each DAAM mounted on the vehicle. The control module i) collects the analysis results transmitted from each DAAM, ii) analyzes the analysis results so-collected to generate vehicle status results that identify potential sources of vehicle anomalies based on the state of the plurality of systems, and iii) transmits the analysis results so-collected and at least a portion of the vehicle status results. A terminal module, located remotely with respect to the vehicle, is in communication with the vehicles in the fleet. The terminal module i) collects the analysis results and vehicle status results transmitted from each control module from the fleet of vehicles, ii) analyzes the analysis results and vehicle status results for the fleet of vehicles to generate fleet results that identify multiple occurrences of vehicle anomalies and multiple occurrences of those vehicle systems operating at a performance level that is unacceptable, and iii) transmits the fleet and individual vehicle results for use by a plurality of organizations to include organizations responsible for the operation, maintenance, monitoring and manufacturing of the vehicles in the fleet as well as the plurality of systems used in the fleet.

DETAILED DESCRIPTION OF THE INVENTION

Figure 1:
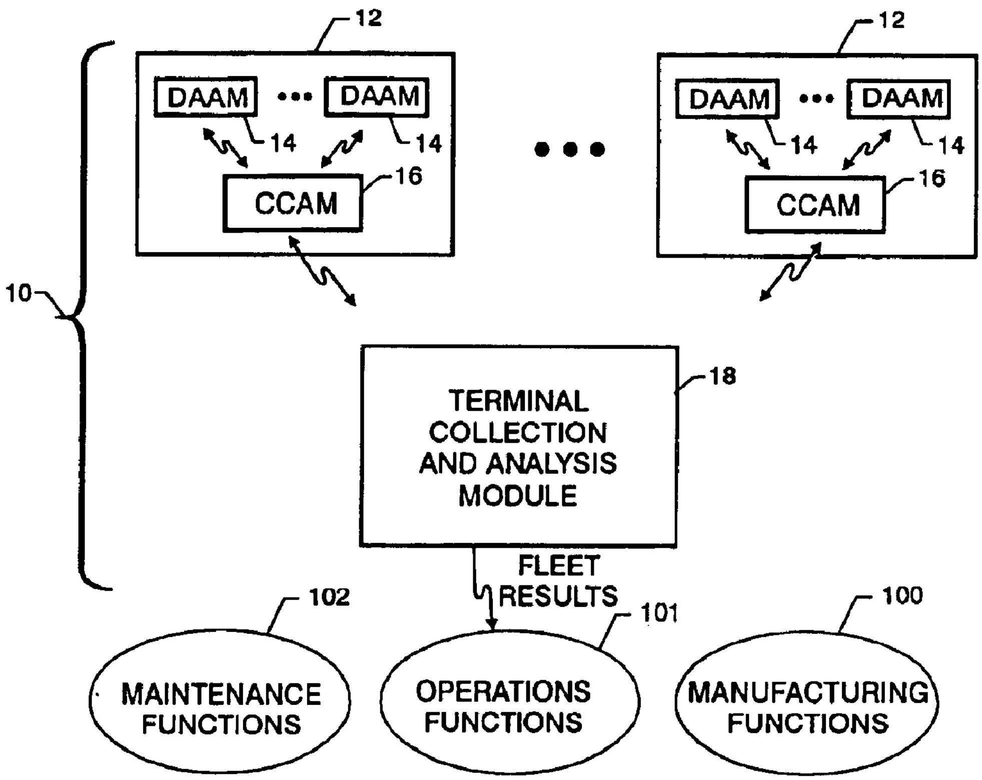
FIG. 1 is a top level schematic view of an embodiment of a tributary analysis monitoring system in accordance with the present invention.

Referring now to the drawings, and more particularly to FIG. 1, an embodiment of a tributary analysis monitoring system in accordance with the present invention is shown and referenced generally by numeral 10. By way of illustrative example, monitoring system 10 will be described for its use in monitoring a fleet of vehicles 12 (e.g., ground vehicles, aircraft, underwater vehicles, etc.) where each vehicle in the fleet is similar or nearly identical in design and construction, although vehicle parts and sub-systems may originate from different vendors. Although vehicle fleet monitoring is provided as an example, the invention is not limited thereto. It can also be applied to the monitoring of other systems such as manufacturing plants, structures, including buildings and bridges, and patients under medical care.

Monitoring system 10 will first be described in terms of a general overview with the aid of FIG. 1. There are three operational levels to monitoring system 10 with the first two levels being maintained onboard each vehicle 12 and the third level being maintained at a location that is remote from each of vehicles 12.

At the first level, each vehicle 12 has one or more data acquisition and analysis modules 14 (or DAAMs as they will be referred to hereinafter) located through vehicle 12. Each of the DAAMs 14 collects data in its locale onboard vehicle 12 for a variety of measurable physical attributes (e.g., sound, temperature, acceleration, vibration, stress, loads, pressure, etc.). The various attributes are sensed in and around sub-systems of vehicle 12 and serve as indicators of, for example, usage, maintenance, performance or degradation thereof, damage, etc., related to particular sub-systems. As used herein, the term "sub-system" includes, but is not limited to, structural components or portions of the vehicle, mechanical systems, electrical systems, hydraulic systems, and pneumatic systems. The collected data is analyzed locally at each of DAAMs 14 with the results of the analysis (e.g., sub-system performance, integrity, damage or degradation) being forwarded to an onboard command control and analysis module (CCAM) 16. Note that the term "analysis results" used herein can indicate both acceptable and unacceptable levels of system usage, maintenance and/or performance.

The forwarding of the analysis results related to the vehicle's sub-systems can be accomplished by hard-wire coupling between each DAAM 14 and CCAM 16. However, for ease of installation and maintenance, communication between each DAAM 14 and CCAM 16 can occur in a wireless fashion (e.g., using radio, microwave or infrared frequencies). For example, in terms of aircrafts, communication can be carried out at a radio frequency of 433 MHz to avoid conflict with other onboard communication or navigation systems.

CCAM 16 defines the second operational level of monitoring system 10 where the first level's analysis results from each DAAM 14 are analyzed in relation to one another to identify potential sources of anomalies on vehicle 12. That is, performance and "health" (i.e., the extent to which a system is not degraded or damaged) of individual sub-systems are analyzed collectively in order to determine locations on the vehicle where sub-system degradation is occurring. The identification of any such sub-system degradation, improper usage, improper maintenance or other vehicle anomaly source, as well as the analysis results collected from a vehicle's DAAM 14, are forwarded to a remotely-located terminal collection and analysis module (TCAM) 18 that defines the third operational level of monitoring system 10. This process is repeated for each of vehicles 12 in the fleet. The forwarding of information from each CCAM 16 to TCAM 18 will typically occur in a wireless fashion (e.g., using RF, infrared, or any other medium for wireless communication).

TCAM 18 analyzes the information collected from each CCAM 16 in order to identify any sub-system problems or source of vehicle anomalies that occur for multiple ones of vehicles 12. Thus, TCAM 18 evaluates the above-described first and second operational level analyses to determine if there are any situations or sub-systems that require further attention on either an individual vehicle or fleet-wide basis. Note that the number of occurrences signaling the need for further attention can vary depending on the importance of a particular sub-system or source of vehicle anomaly.

The results of the analysis performed by TCAM 18 are transmitted to interested organizations, such as those involved with manufacturing functions 100 (e.g., sub-system vendors and their factories, factories for the assembly of the vehicles, etc.), operations functions 101 and/or maintenance functions 102 of vehicles 12. Such transmissions can occur autonomously via processing control systems internal to TCAM 18. Since analysis of the data collected from individual vehicles has already been performed, functions 100, 101 and/or 102 receive information on which they can act immediately. The transmission of fleet results can occur, for example, via wireless communication links, via e-mail, via file transfer protocols, etc. The choice of one or more transmission media is not a limitation of the present invention.

Should there be only one vehicle, TCAM 18 can be eliminated and the identification of any such sub-system degradation, improper usage, improper maintenance or other vehicle anomaly source, as well as the analysis results collected from the vehicle's DAAM 14, can be transmitted directly to interested organizations.

Figure 2:
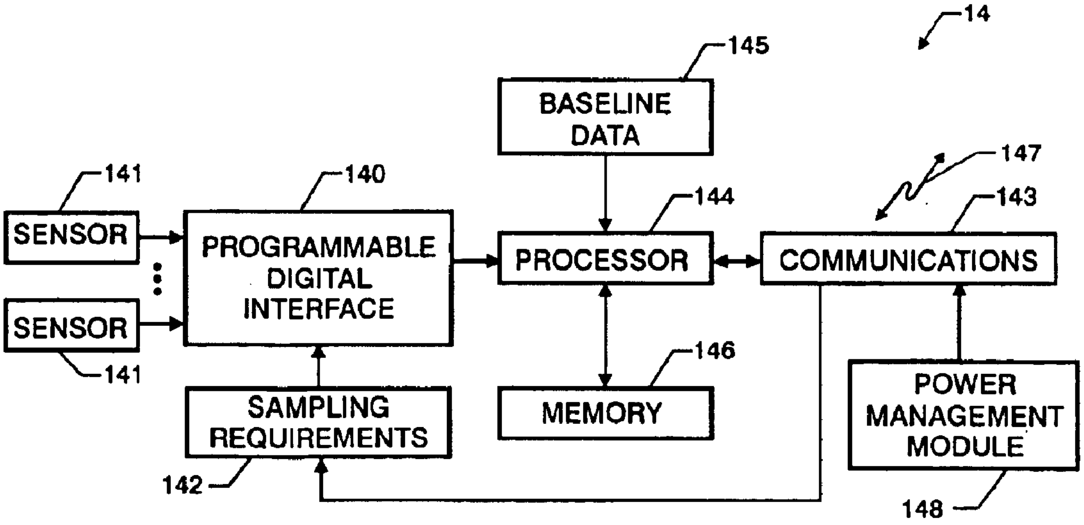
FIG. 2 is a schematic view of a data acquisition and analysis module of the tributary analysis monitoring system.

Referring additionally now to FIG. 2, an embodiment of one DAAM 14 is shown in schematic form. DAAM 14 includes a programmable digital interface 140 for sampling data from a plurality of sensors 141, each of which is mounted on vehicle 12 to measure some attribute at a particular location on vehicle 12. Sensors 141 can be pre-existing sensors (i.e., not part of DAAM 14) mounted on vehicle 12 and physically connected (e.g., by wire or flex circuits) to DAAM 14, or sensors 141 can be included as part of DAAM 14. Programmable digital interface 140 can be any user-configurable device (e.g., programmable logic device, field programmable gate array, etc.) that is configurable with specifications typically contained in a user-supplied file. Programmable digital interface 140 is capable of sampling data collected by sensors 141 in accordance with user-supplied sampling requirements 142 (e.g., sampling rate, duration, start/stop time, etc.) that can be specified for each sensor 141. The number of sensors sampled by each DAAM is controlled by programmable digital interface 140. Sampling requirements 142 can be supplied and changed via instructions received through a communication module 143. Such instructions can originate at the vehicle's CCAM 16, or could be relayed by CCAM 16 if they originate from the monitoring system's TCAM 18. Additionally or alternatively, sampling requirements 142 could be supplied directly to programmable digital interface 140 by means of a hardwire (serial) line (not shown).

The digital data samples collected by programmable digital interface 140 are supplied to a processor 144 that performs the first level analysis thereof. In general, the first level analysis involves comparing the various measured attributes with known acceptable performance levels, and then evaluating the meaning of such comparisons when one or more of the measured attributes indicates an unacceptable performance level. Comparisons can be based on, for example, amplitude or frequency characteristics of data, quantitative reduction algorithms which are well know to those skilled in the art, or subjective analysis using fuzzy logic.

To accomplish this, processor 144 is supplied with baseline data 145 (e.g., envelopes and/or profiles associated with the measurable attributes) indicative of acceptable/unacceptable levels for the individually-measured attributes as well as interpretations of what unacceptable levels of performance may indicate. Baseline data 145 can be realized by: i) a memory storage device storing known performance metrics, ii) a neural network trained to establish performance metrics and patterns thereof when the vehicle is known to be operating properly, or iii) a combination of memory storage and neural network devices.

Analysis performed by processor 144 can utilize an expert system to incorporate both subjective human reasoning and other analysis algorithms to identify the state of various sub-systems (e.g., structures, mechanical devices, electrical devices, etc.) of the vehicle. In some instances, a single measured attribute may serve as the means for evaluating the state of a subsystem. For such cases, simple comparisons with baseline data 145 will identify the state of the sub-system. However, it is more common that various levels of performance or a number of measured attributes must be evaluated collectively to accurately evaluate the state of a sub-system. In these cases, processor 144 must be able to weigh the significance of the relevant measured attributes in relation to one another. Thus, processor 144 will incorporate an expert system such as a fuzzy logic-based expert system. As is known in the art, fuzzy expert systems apply inference logic based on subjective reasoning and quantitative analysis. Fuzzy logic is used to emulate predicate reasoning (i.e., if "A" then "B") for many combinations of antecedents "A" which are used to form a consequence "B". Fuzzy logic can also emulate human qualitative reasoning with the capability of incorporating multiple qualitative objectives.

Analysis results in terms of the state of sub-systems of vehicle 12 can be archived using a memory 146 and can be transmitted to the vehicle's CCAM 16 as indicated by two-headed arrow 147. Since only analysis results are transmitted from communications module 143 (as opposed to large amounts of raw sensor data collected by programmable digital interface 140), telemetry congestion between DAAMs 14 and CCAM 16 is essentially non-existent. Furthermore, it may not be necessary to transmit all analysis results. For example, if one or more sub-systems are working correctly, it may only be necessary to transmit analysis results related thereto on a periodic basis as a means of indicating proper operation of DAAM 14.

To conserve power, DAAM 14 can also include a power management module 148 coupled to communications module 143. Power management module 148 cycles power to communications module 143 in an "on-off" fashion. During the "power on" times, communications module 143 performs its transceiver functions. Power is supplied to communications module 143 as long as needed for the current transceiving operations to be completed. However, if no signals are broadcast or received within a short time (e.g., 2 milliseconds) after the "power on" condition is initiated, power management module 148 turns off the power for a specified period (e.g., 2 seconds) before turning the power on again.

Figure 3:
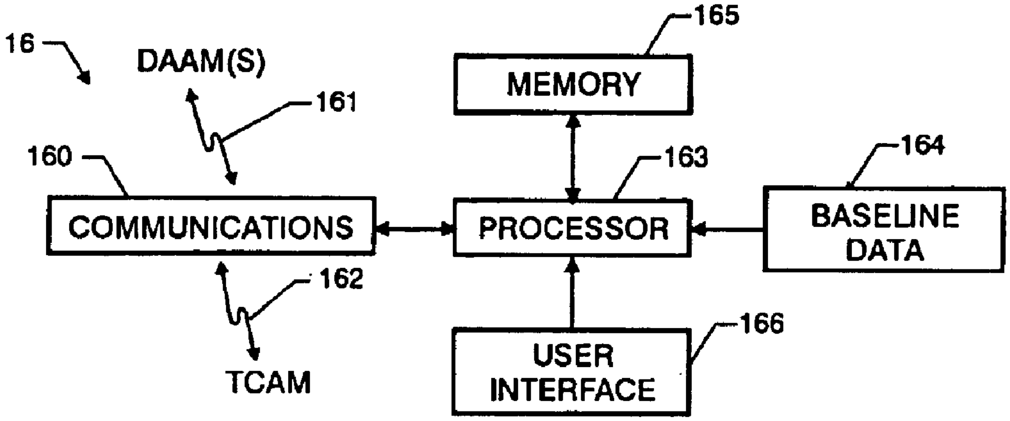
FIG. 3 is a schematic view of a control and analysis module of the tributary analysis monitoring system.

Referring additionally now to FIG. 3, an embodiment of a vehicle's CCAM 16 is shown in schematic form. As mentioned above, CCAM 16 provides command and control instructions for each DAAM 14 as well as performs the second level of analysis for monitoring system 10. CCAM 16 includes a communication module 160 for communication with each DAAM 14 onboard it's vehicle (as indicated by two-headed arrow 161) and for communication with the fleet's TCAM 18 (as indicated by two-headed arrow 162). Transmissions to each DAAM 14 can include power on/power off control, sampling requirements 142, requests for analysis results, queries related to DAAM status, etc., while transmissions collected from each DAAM 14 can include the afore-described analysis results, status signals from each DAAM 14, etc. Transmissions to TCAM 18 can include analysis results from the vehicle's DAAMs 14, vehicle level analysis results generated by CCAM 16 (to be described below), status signals from CCAM 16, etc., while transmissions received from TCAM 18 can include requests for processing results, operational instruction updates, etc.

In terms of analysis results collected from the vehicle's DAAMs 14, CCAM 16 includes a processor 163 for performing the second level of analysis for monitoring system 10. One goal of analysis performed at a vehicle's CCAM level is to determine if any analysis derived from one DAAM has a relationship to that derived from other DAAM(s) onboard the vehicle. For example, there may be a spatial distribution of anomalies observed by multiple DAAMs that is indicative of a particular problem. Another example is the use of triangulation to locate an anomaly sensed by multiple DAAMs onboard a vehicle.

As in the first level of analysis, processor 163 utilizes an expert system such as a fuzzy logic-based expert system which may require baseline data 164 to perform its analysis. At this second level of analysis, CCAM 16 evaluates the state of the sub-systems determined and transmitted by each DAAM 14 with the goal of such evaluation being to identify potential sources of vehicle problems (e.g., in terms of component damage and/or performance degradation) based on the state of vehicle sub-systems. That is, processor 163 applies inference logic based on vehicle sub-system states. For example, such inference logic might take the form of "If sub-system X is in state A and sub-system Y is in state B, then vehicle problem Z may be C." It is to be understood that the inference logic may evaluate more or less than two sub-systems. Further, sub-system states from different DAAMs 14 can be evaluated at processor 163. In essence, this allows CCAM 16 to evaluate overall vehicle health as known relationships between sub-systems are taken into account by the fuzzy inference logic.

The results generated by processor 163 (referred to herein as "vehicle status results" which are indicative of a fusion of the sub-system analysis results from the vehicle's DAAMs 14), as well as the analysis results from each of DAAMs 14, are forwarded to communication module 160 for transmissions as signals 162 to TCAM 18. Such transmissions can occur autonomously or when requested by TCAM 18. For example, in the case of vehicles traveling great distances such as aircraft, TCAM 18 may be located at one or more airports. Each TCAM 18 can continually transmit query signals which would be answered by aircraft in the fleet when those aircraft are on the ground at the respective airport. Conversely, if the fleet of vehicles are maintained in relatively close proximity, transmissions to TCAM 18 can be scheduled to take place automatically either as problems are identified or on a periodic basis. As with the first level analysis results, it may be desirable to periodically send vehicle status results that indicate no problems as a means to verify the operational integrity of monitoring system 10. Vehicle status results can also be archived using a memory 165.

A user interface 166 can be provided to allow a user onboard the vehicle to control functions of a selected DAAM 14, control data downloads from DAAMs 14 or uploads from TCAM 18, control retrievals from or erasures of memory 165, etc. Realization of user interface 166 can take the form of a personal computer, a personal data assistant, a dedicated keypad, etc., the choice of which is not a limitation of the present invention.

Figure 4:
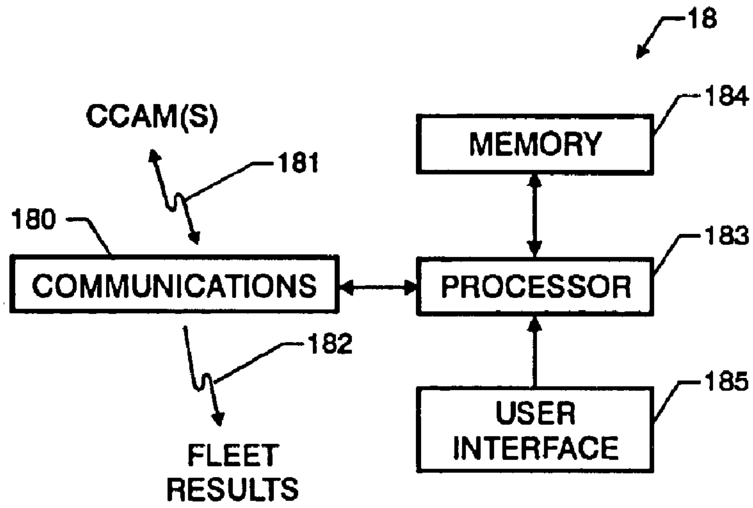
FIG. 4 is a schematic view of the terminal collection and analysis module of the tributary analysis monitoring system.

Referring additionally now to FIG. 4, an embodiment of a fleet-wide TCAM 18 is shown in schematic form. As mentioned above, TCAM 18 provides the third level of analysis for monitoring system 10 in order to identify fleet-wide problems and transmit identification of such problems to relevant organizations. TCAM 18 includes a communication module 180 for communication with each of the vehicle's CCAM 16 (as indicated by two-headed arrow 181) and for communication of the fleet results to relevant organizations (as indicated by arrow 182). Transmissions to each CCAM 16 can include requests for results and operational programming changes for each vehicle's CCAM 16 and/or DAAMs 14.

Each vehicle's (sub-system) analysis results (generated at DAAMs 14 and passed through CCAM 16) and vehicle status results (generated at CCAM 16) are provided to a processor 183 for performance of the third level of analysis in the present invention. As with each of the first and second levels, processor 183 utilizes an expert system such as a fuzzy logic-based expert system. This third level of analysis is performed for all vehicles in the fleet reporting to TCAM 18. For example, such inference logic might take the form of "If sub-system X is in state A for R vehicles, then notify vendor D that its sub-system may be problematic." It is to be understood that several sub-systems can be imbedded in an inference logic statement. In general, the third level of analysis in the present invention "looks" for clusters of similar results as an indication that these may be indicative of a problematic sub-system in each vehicle in the fleet. If such clusters exist in the fleet, the expert system also determines which of manufacturing functions 100, operations functions 101 and/or maintenance functions 102 should be notified.

The fleet results generated by processor 183 (as well as the results from vehicle's DAAMs 14 and CCAM 16) are transmitted by communications module 180 to one or more of manufacturing functions 100, operations functions 101 and maintenance functions 102. Fleet results can also be archived using a memory 184. TCAM 18 can be controlled via user interface 185.

Each analysis level of monitoring system 10 can utilize a fuzzy logic-based expert system. The advantages associated with using fuzzy logic expert systems include: i) interpolation/extrapolation with fewer rules than traditional binary expert systems, ii) their robustness, and iii) their ability to produce good results in cases where mathematical descriptions of the systems being analyzed are not available or are of questionable fidelity. However, to date, one must be knowledgeable in fuzzy logic in order to design an expert system based thereon.

The present invention alleviates this problem by providing a fuzzy logic expert system development tool that can be used at each analysis level in the present invention. The development tool allows users to develop a fuzzy logic expert system by merely providing the following to the processor onboard each DAAM, CCAM or TCAM:

i) sets of antecedent-consequence decision rules of the form "If A is S and if B is M and C is L, then D is L", where A, B, C and D are linguistic variables;

ii) sets of numerical values for each of the linguistic variables (i.e., numerical values for the A's, B's, C's and D's associated with each rule); and iii) lower and upper limits for the numerical values associated with each linguistic variable.

Each user-supplied decision rule is of the form of a single antecedent and single consequence or a union of multiple antecedents and a single consequence. For example, the form of a rule could be "If A is S and if B is M and C is L, then D is L." When there is an intersection of antecedents (i.e., antecedents combined using the "or" conjunction) such as "If A is S or if B is M, then D is L," the rule is reduced to a collection of rules with single antecedents and single consequence such as "If A is S, then D is L" and "If B is M, then D is L."

Figures 5, 6A:
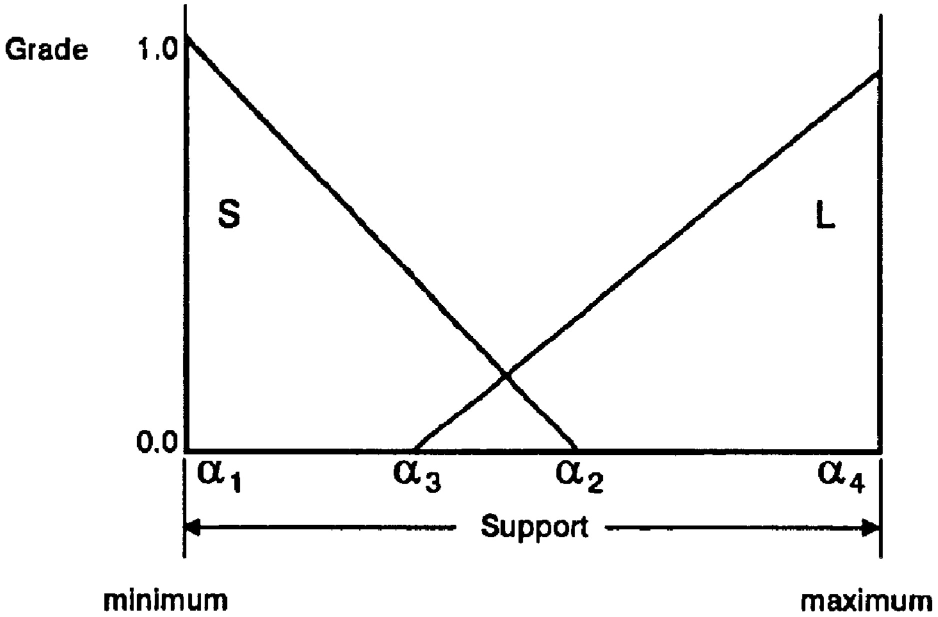
FIG. 5 is an example of an antecedent-consequence decision rule matrix used by the fuzzy logic expert system development tool of the present invention.
FIGS. 6A–6D are graphic depictions of exemplary linguistic variable parameterized fuzzy membership functions for the antecedents and consequences in the decision rule matrix example in FIG. 5.
Figure 6B:
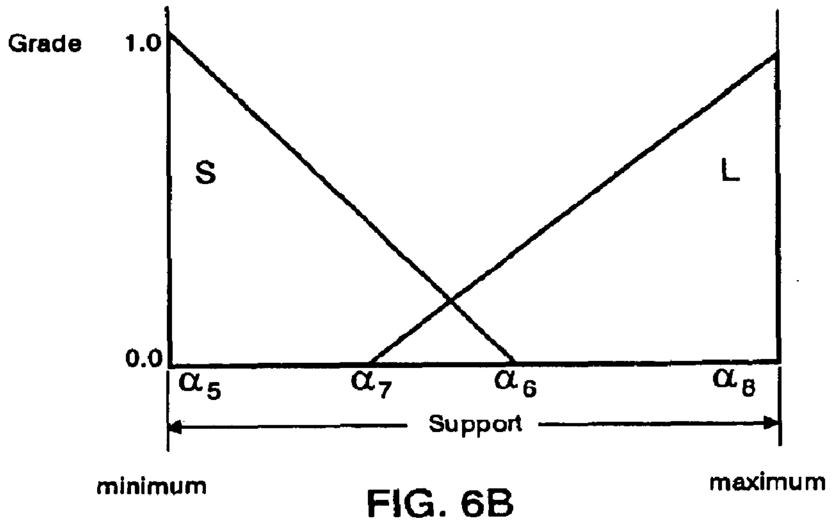
Figure 6C:
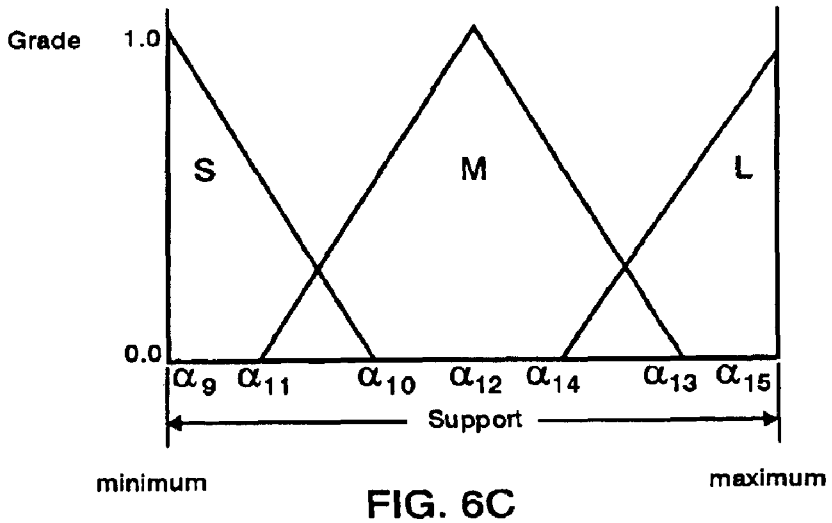
Figure 6D:
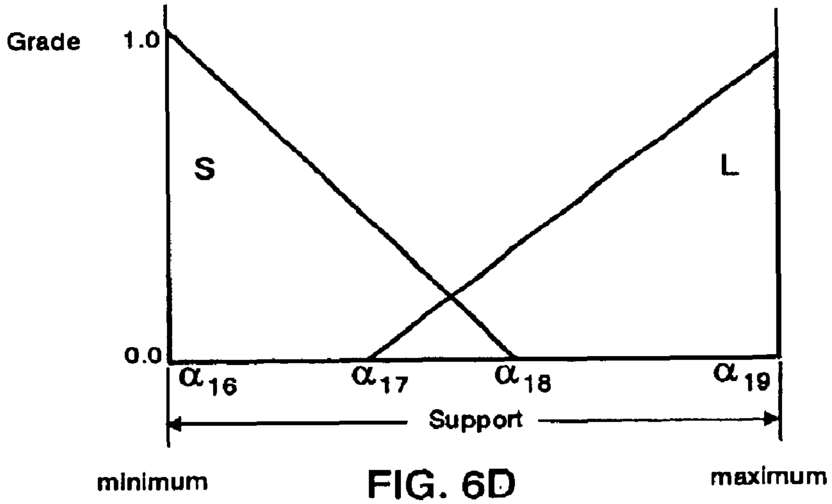

By way of illustrative example, nine decision rules are shown in a matrix form in FIG. 5 where a column is provided for each linguistic variable (e.g., a column for each of A, B, C and D in this case). The first three columns are antecedents and the last column is the consequence. The elements for each column are the fuzzy term sets for the linguistic variables (e.g., linguistic variable B has fuzzy term sets S and L). Each row of the matrix is a unique decision rule.

As mentioned above, the user is also required to supply a table of desired numerical values for the antecedents and consequences described in the decision rule matrix. A minimum of one set of numerical values is required for each decision rule. However, providing multiple sets of numerical values for each decision rule will result in better tuning of the expert system.

In accordance with the present invention's fuzzy expert system development tool, the decision rule matrix is used to configure the fuzzy expert system. First, the number of linguistic variables and the number of fuzzy term sets for each linguistic variable are automatically determined by evaluating changes in adjacent column elements of the decision rule matrix. Next, permutations of all combinations of antecedents and consequences are used to identify possible decision rules that the user may have omitted. Finally, the sets of numerical values are used to tune the fuzzy membership functions for all term sets belonging to a respective linguistic variable.

More specifically, the development tool automatically develops parameterized fuzzy membership functions from the decision rule matrix using a membership distribution (e.g., a membership distribution such as triangular, rectangular, monotonic, bell-shaped, trapezoidal, etc.). For example, parameterized fuzzy membership functions for the four linguistic variables A, B, C and D (shown in the FIG. 5 decision rule matrix) are shown in FIGS. 6A–6D, respectively. In the illustrated example, the parameterized fuzzy sets use a triangular membership distribution but any of the other afore-mentioned membership distributions can be used. In each of FIGS. 6A–6D, the first and last sets are defined as having membership grades of 1.0 at the minimum and maximum support limits, respectively. Thus, two parameters are used to define membership distributions of the first and last sets. The $\alpha$'s are used to define the base abscissa where the membership grade is 0.0, and the first/last abscissa where the membership grade is 1.0. Intermediate sets (e.g., set M) are defined using three parameters as the $\alpha$'s are used to define the base and apex abscissa for the triangular membership function distributions used. The membership function has a grade of 1.0 at the apex for all such intermediate sets. Thus, the linguistic variables and associated parameters for the decision rule matrix example in FIG. 5 are given as follows:

A: $\alpha_1$, $\alpha_2$, $\alpha_3$ and $\alpha_4$

B: $\alpha_5$, $\alpha_6$, $\alpha_7$ and $\alpha_8$

C: $\alpha_9$, $\alpha_{10}$, $\alpha_{11}$, $\alpha_{12}$, $\alpha_{13}$, $\alpha_{14}$ and $\alpha_{15}$ D: $\alpha_{16}$, $\alpha_{17}$, $\alpha_{18}$ and $\alpha_{19}$ Membership grades range from 0 (non-membership) to 1.0 (complete membership). Minimum and maximum supports determine the range of values for which the linguistic variables are valid. All fuzzy sets for a respective linguistic variable can only be defined within the bounds of the minimum and maximum supports. The membership functions can overlap, which allows a value of the linguistic variable to have membership in more than one fuzzy set. The resulting parameters $\alpha_1, \ldots, \alpha_n$, that are used to define all antecedent and consequence membership function distributions are combined together to form a design vector. In the illustrated example, n=19.

Next, the development tool of the present invention, optimizes the design vector to thereby tune the fuzzy expert system. In general, the objective of tuning is to reduce error between the set of consequences supplied by the user (for a set of antecedent combinations) and the set of consequences produced by a fuzzy inference algorithm configured with the same set of antecedent combinations and the design vector. When the error is reduced below a desired level, the fuzzy expert system (i.e., defined by the design vector and the user-supplied antecedent combinations) is tuned. The tuning process is iterative with new design vectors being produced using standard optimization techniques such as numerical optimization, gradient searches or genetic algorithms. For numerical optimization, see Woodard et al. in "A Numerical Optimization Approach for Tuning Fuzzy Logic Controllers," IEEE Transactions on System, Man and Cybernetics—Part B; Cybernetics, Vol. 29, No. 4, 1999, p. 565–569, and Stanley E. Woodard and Devendra P. Garg, A Numerical Optimization Approach for Tuning Fuzzy Logic Controllers, Third Joint Conference on Information Sciences, Durham, N.C., Mar. 1–5, 1997, the contents of both of which are hereby incorporated by reference.

Figure 7:
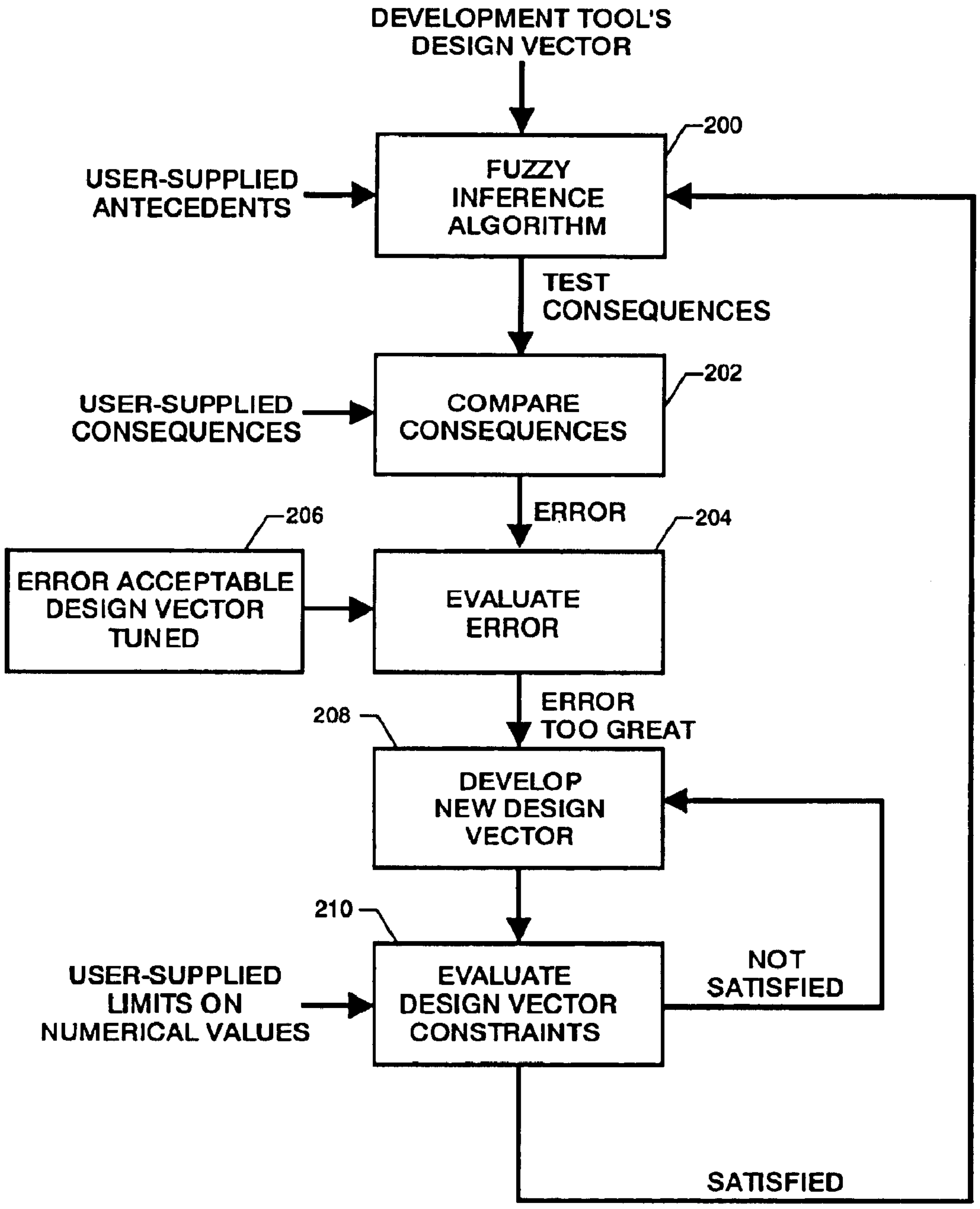
FIG. 7 is a flowchart of the process used to tune the design vector of parameters defined by the parameterized fuzzy membership functions.

Referring now to FIG. 7, a flowchart of the tuning process is illustrated. Initially, a fuzzy inference algorithm at block 200 is configured with the user-supplied antecedents (e.g., the A's, B's and C's) and the development tool's design vector of $\alpha$'s. The fuzzy inference algorithm so-configured generates a set of consequences (referred to herein as "test consequences") which are compared at block 202 with the user-supplied consequences (e.g., the numerical values associated with linguistic variable D in the illustrated example). The difference between the user-supplied consequences and the test consequences are numerical errors that are evaluated at block 204. If the errors are within acceptable limits, the design vector is considered to be tuned (as indicated at block 206) so that the fuzzy inference algorithm so-configured at block 200 is the tuned fuzzy expert system. However, if the errors are unacceptable, the design vector is changed at block 208 using one of the afore-mentioned optimization techniques. Constraints on the design vector (e.g., range of values) can be evaluated in the tuning process at step 210 using the user-supplied limits on the numerical values associated with each linguistic variable. The resulting (updated) design vector is used to reconfigure the fuzzy inference algorithm at block 200 as the iterative process starts anew.

The advantages of the present invention are numerous. The architecture described herein provides a framework for tributary analysis. Each operational level is capable of performing autonomous analysis with a trained expert system. The expert system is parameterized which makes it adaptable to be trained to both a user's subjective reasoning and existing quantitative analytic tools. All measurements at the lowest operational level are reduced to provide analysis results necessary to gauge changes from established baselines. These changes are then collected at the next level to identify any global trends or common features from the prior level. This process is repeated until the results are reduced at the highest operational level. In the framework, only analysis results are forwarded to the next level to reduce telemetry congestion. Additionally, the invention can be retrofitted into existing systems using a suitable housing and mounting hardware with "bolt-on/bolt-off" simplicity. Further discussion of the present invention is provided in Woodard et al., Development and Flight Testing of an Adaptable Vehicle Health-Monitoring Architecture, NASA/TM-2003-212139, January 2003, pp. 34, and Woodard et al., Development and Flight Testing of an Adaptable Vehicle Health-Monitoring Architecture, AIAA Journal of Aircraft, Vol. 40, No. 5, both of which are hereby incorporated by reference.

Although the invention has been described relative to a specific embodiment thereof, there are numerous variations and modifications that will be readily apparent to those skilled in the art in light of the above teachings. For example, many or all of the elements and operational features of each DAAM 14 can be integrated into a single microchip using a system-on-chip design. The obvious benefits of such a construction include reduced size, mass and power requirements, flexible external interface connections, and simplified software/hardware integration. It is therefore to be understood that, within the scope of the appended claims, the invention may be practiced other than as specifically described.

What is claimed as new and desired to be secured by Letters Patent of the United States is:

1. A monitoring system for a fleet of vehicles, comprising:

at least one data acquisition and analysis module (DAAM) mounted on a vehicle in the fleet, each said DAAM i) collecting data indicative of measurable attributes of the vehicle, ii) analyzing said data to generate analysis results that identifies the state of one or more sub-systems of the vehicle based on said measurable attributes, and iii) transmitting at least a portion of said analysis results;

a control module mounted on the vehicle and in communication with each said DAAM mounted on the vehicle, said control module i) collecting said analysis results transmitted from each said DAAM, ii) analyzing said analysis results so-collected to generate vehicle status results that identify potential sources of vehicle anomalies based on the state of said one or more sub-systems, and iii) transmitting said analysis results so-collected and at least a portion of said vehicle status results; and a terminal module located remotely with respect to the vehicle and in communication with the vehicle as well as other vehicles in the fleet wherein each of the other vehicles in the fleet is equipped with their own said at least one DAAM and said control module, said terminal module i) collecting, from the fleet of vehicles, said analysis results and said vehicle status results transmitted from each said control module, ii) analyzing, for the fleet of vehicles, said analysis results and said vehicle status results transmitted from each said control module to generate fleet results that identify multiple occurrences of said vehicle anomalies and multiple occurrences of ones of said one or more sub-systems operating at a performance level that is unacceptable, and iii) transmitting said fleet results for use by one or more interested organizations.

2. A monitoring system as in claim 1 wherein said one or more interested organizations comprises one or more organizations responsible for the one or more of operation, maintenance, monitoring, and manufacturing of the vehicles in the fleet and said one or more sub-systems used in the fleet.

3. A monitoring system as in claim 1 wherein each said DAAM, each said control module and said terminal module includes an expert system for performing said analyzing function associated therewith.

4. A monitoring system as in claim 3 wherein each said expert system is a fuzzy expert system.

5. A monitoring system as in claim 1 wherein each said DAAM includes means for providing baseline data for each of said measurable attributes, said baseline data defining an acceptable level of performance for each of said measurable attributes.

6. A monitoring system as in claim 5 wherein said means for providing said baseline data is a memory device.

7. A monitoring system as in claim 5 wherein said means for providing said baseline data is a neural network trained when the vehicle is known to be operating correctly.

8. A monitoring system as in claim 1 wherein said terminal module transmits autonomously.

9. A monitoring system as in claim 1 wherein each said DAAM comprises:

programmable means for sampling said data in accordance with user-supplied criteria;

means for providing baseline data for each of said measurable attributes, said baseline data defining an acceptable level of performance for each of said measurable attributes;

a processor coupled to said programmable means and said means for providing said baseline data, said processor analyzing said data so-sampled in relation to said baseline data to generate said analysis results; and communication means coupled to said processor for broadcasting said analysis results.

10. A monitoring system as in claim 9 wherein said processor incorporates an expert system.

11. A monitoring system as in claim 10 wherein said expert system is a fuzzy expert system.

12. A monitoring system for a fleet of vehicles, comprising:

at least one data acquisition and analysis module (DAAM) mounted on a vehicle in the fleet, each said DAAM having i) a programmable digital interface for collecting data indicative of measurable attributes of the vehicle, ii) an expert system coupled to said programmable digital interface for analyzing said data to generate analysis results that identifies the state of one or more sub-systems of the vehicle based on said measurable attributes, and iii) communication means coupled to said DAAM's expert system for transmitting at least a portion of said analysis results;

a control module mounted on the vehicle and in communication with each said DAAM mounted on the vehicle, said control module having i) communication means for the transmission and reception of signals, said control module's communication means receiving said analysis results transmitted from each said DAAM, and ii) an expert system coupled to said control module's communication means for analyzing said analysis results so-received to generate vehicle status results that summarize the state of relationships between said one or more sub-systems, wherein said control module's communication means transmits at least a portion of said vehicle status results; and a terminal module located remotely with respect to the vehicle and in communication with the vehicle as well as other vehicles in the fleet wherein each of the other vehicles in the fleet is equipped with their own said at least one DAAM and said control module, said terminal module having i) communication means for the transmission and reception of signals, said terminal module's communication means receiving said vehicle status results transmitted from the vehicle and each of the other vehicles in the fleet, and ii) an expert system coupled to said terminal module's communication means for analyzing said vehicle status results so-received to generate fleet results that summarize the state of said one or more sub-systems and said relationships between said one or more sub-systems for the fleet, wherein said terminal module's communication means transmits said fleet results for use by one or more interested organizations.

13. A monitoring system as in claim 12 wherein said one or more interested organizations comprises one or more organizations responsible for the one or more of operation, maintenance, monitoring, and manufacturing of the vehicles in the fleet and said one or more sub-systems used in the fleet.

14. A monitoring system as in claim 12 wherein each said expert system is a fuzzy expert system.

15. A monitoring system as in claim 12 wherein each said DAAM includes means coupled to said DAAM's expert system for providing baseline data thereto for each of said measurable attributes, said baseline data defining an acceptable level of performance for each of said measurable attributes.

16. A monitoring system as in claim 15 wherein said means for providing said baseline data is a memory device.

17. A monitoring system as in claim 15 wherein said means for providing said baseline data is a neural network trained when the vehicle is known to be operating correctly.

18. A monitoring system as in claim 12 wherein said terminal module's communication means transmits said fleet results autonomously.

19. A monitoring system for a fleet of vehicles, comprising:

at least one data acquisition and analysis module (DAAM) mounted on a vehicle in the fleet, each said DAAM having i) a programmable digital interface for collecting data indicative of measurable attributes of the vehicle, ii) a fuzzy logic expert system coupled to said programmable digital interface for analyzing said data to generate analysis results that identifies the state of one or more sub-systems of the vehicle based on said measurable attributes, and iii) communication means coupled to said DAAM's expert system for transmitting at least a portion of said analysis results;

a control module mounted on the vehicle and in communication with each said DAAM mounted on the vehicle, said control module having i) communication means for the transmission and reception of signals, said control module's communication means receiving said analysis results transmitted from each said DAAM, and ii) a fuzzy logic expert system coupled to said control module's communication means for analyzing said analysis results so-received to generate vehicle status results that summarize the state of relationships between said one or more sub-systems, wherein said control module's communication means transmits at least a portion of said vehicle status results;

a terminal module located remotely with respect to the vehicle and in communication with the vehicle as well as other vehicles in the fleet wherein each of the other vehicles in the fleet is equipped with their own said at least one DAAM and said control module, said terminal module having i) communication means for the transmission and reception of signals, said terminal module's communication means receiving said vehicle status results transmitted from the vehicle and each of the other vehicles in the fleet, and ii) a fuzzy logic expert system coupled to said terminal module's communication means for analyzing said vehicle status results so-received to generate fleet results that summarize the state of said one or more sub-systems and said relationships between said one or more sub-systems for the fleet, wherein said terminal module's communication means transmits said fleet results for use by one or more interested organizations; and each said fuzzy logic expert system incorporating a tool for development thereof, said tool being supplied with a plurality of decision rules indicative of user-supplied consequences based on user-supplied antecedents indicative of said measurable attributes, said tool i) generating a design vector of parameters that defines all antecedent and consequence membership function distributions associated with said plurality of decision rules, ii) configuring a fuzzy inference algorithm with said user-supplied antecedents and said design vector, wherein test consequences are generated thereby, iii) comparing said test consequences with said user-supplied consequences wherein differences therebetween are generated, and iv) minimizing said differences by optimizing said design vector wherein said fuzzy inference algorithm so-configured with said user-supplied antecedents and said design vector so-optimized defines said fuzzy logic expert system.

20. A monitoring system as in claim 19 wherein each said DAAM includes means coupled to said DAAM's expert system for providing baseline data thereto for each of said measurable attributes, said baseline data defining an acceptable level of performance for each of said measurable attributes.

21. A monitoring system as in claim 20 wherein said means for providing said baseline data is a memory device.

22. A monitoring system as in claim 20 wherein said means for providing said baseline data is a neural network trained when the vehicle is known to be operating correctly.

23. A monitoring system as in claim 19 wherein said terminal module's communication means transmits said fleet results autonomously.

24. A monitoring system as in claim 19 wherein said one or more interested organizations comprises one or more organizations responsible for the one or more of operation, maintenance, monitoring, and manufacturing of the vehicles in the fleet and said one ore more sub-systems used in the fleet.

25. A monitoring system for a group of systems, comprising:

at least one data acquisition and analysis module (DAAM) mounted on a system in the group, each said DAAM i) collecting data indicative of measurable attributes of the system, ii) analyzing said data to generate analysis results that identifies the state of one or more sub-systems of the system based on said measurable attributes, and iii) transmitting at least a portion of said analysis results;

a control module mounted on the system and in communication with each said DAAM mounted on the system, said control module i) collecting said analysis results transmitted from each said DAAM, ii) analyzing said analysis results so-collected to generate system status results that identify potential sources of system anomalies based on the state of said one or more sub-systems, and iii) transmitting said analysis results so-collected and at least a portion of said system status results; and a terminal module located remotely with respect to the system and in communication with the system as well as other systems in the group wherein each of the other systems in the group is equipped with their own said at least one DAAM and said control module, said terminal module i) collecting, from the group of systems, said analysis results and said system status results transmitted from each said control module, ii) analyzing, for the group of systems, said analysis results and said system status results transmitted from each said control module to generate group results that identify multiple occurrences of said system anomalies and multiple occurrences of ones of said one or more sub-systems operating at a performance level that is unacceptable, and iii) transmitting said group results for use by one or more interested organizations.

26. A monitoring system as in claim 25 wherein said one or more interested organizations comprises one or more organizations responsible for the one or more of operation, maintenance, monitoring, and manufacturing of the structures in the group and said one or more sub-systems used in the group.

27. A monitoring system as in claim 25 wherein each said DAAM, each said control module and said terminal module includes an expert system for performing said analyzing function associated therewith.

28. A monitoring system as in claim 27 wherein each said expert system is a fuzzy expert system.

29. A monitoring system as in claim 25 wherein each said DAAM includes means for providing baseline data for each of said measurable attributes, said baseline data defining an acceptable level of performance for each of said measurable attributes.

30. A monitoring system as in claim 29 wherein said means for providing said baseline data is a memory device.

31. A monitoring system as in claim 29 wherein said means for providing said baseline data is a neural network trained when the structure is known to be operating correctly.

32. A monitoring system as in claim 25 wherein said terminal module transmits autonomously.

33. A monitoring system as in claim 25 wherein each said DAAM comprises:

programmable means for sampling said data in accordance with user-supplied criteria;

means for providing baseline data for each of said measurable attributes, said baseline data defining an acceptable level of performance for each of said measurable attributes;

a processor coupled to said programmable means and said means for providing said baseline data, said processor analyzing said data so-sampled in relation to said baseline data to generate said analysis results; and communication means coupled to said processor for broadcasting said analysis results.

34. A monitoring system as in claim 33 wherein said processor incorporates an expert system.

35. A monitoring system as in claim 34 wherein said expert system is a fuzzy expert system.

36. A monitoring system as in claim 25 wherein the group of systems is selected from the group consisting of manufacturing plants, structures including buildings and bridges, vehicles, and patients under medical care.

37. A monitoring system for a group of systems, comprising:

at least one data acquisition and analysis module (DAAM) mounted on a system in the group, each said DAAM having i) a programmable digital interface for collecting data indicative of measurable attributes of the system, ii) an expert system coupled to said programmable digital interface for analyzing said data to generate analysis results that identifies the state of one or more sub-systems of the system based on said measurable attributes, and iii) communication means coupled to said DAAM's expert system for transmitting at least a portion of said analysis results;

a control module mounted on the structure and in communication with each said DAAM mounted on the system, said control module having i) communication means for the transmission and reception of signals, said control module's communication means receiving said analysis results transmitted from each said DAAM, and ii) an expert system coupled to said control module's communication means for analyzing said analysis results so-received to generate system status results that summarize the state of relationships between said one or more sub-systems, wherein said control module's communication means transmits at least a portion of said system status results; and a terminal module located remotely with respect to the system and in communication with the system as well as other systems in the group wherein each of the other systems in the group is equipped with their own said at least one DAAM and said control module, said terminal module having i) communication means for the transmission and reception of signals, said terminal module's communication means receiving said system status results transmitted from the system and each of the other systems in the group, and ii) an expert system coupled to said terminal module's communication means for analyzing said system status results so-received to generate group results that summarize the state of said one or more sub-systems and said relationships between said one or more sub-systems for the group, wherein said terminal module's communication means transmits said group results for use by one or more interested organizations.

38. A monitoring system as in claim 37 wherein said one or more interested organizations comprises one or more organizations responsible for the one or more of operation, maintenance, monitoring, and manufacturing of the systems in the group and said one or more sub-systems used in the group.

39. A monitoring system as in claim 37 wherein each said expert system is a fuzzy expert system.

40. A monitoring system as in claim 37 wherein each said DAAM includes means coupled to said DAAM's expert system for providing baseline data thereto for each of said measurable attributes, said baseline data defining an acceptable level of performance for each of said measurable attributes.

41. A monitoring system as in claim 40 wherein said means for providing said baseline data is a memory device.

42. A monitoring system as in claim 40 wherein said means for providing said baseline data is a neural network trained when the system is known to be operating correctly.

43. A monitoring system as in claim 37 wherein said terminal module's communication means transmits said group results autonomously.

44. A monitoring system as in claim 37 wherein the group of systems is selected from the group consisting of manufacturing plants, structures including buildings and bridges, vehicles, and patients under medical care.

45. A monitoring system for a group of systems, comprising:

at least one data acquisition and analysis module (DAAM) mounted on a system in the group, each said DAAM having i) a programmable digital interface for collecting data indicative of measurable attributes of the system, ii) a fuzzy logic expert system coupled to said programmable digital interface for analyzing said data to generate analysis results that identifies the state of one or more sub-systems of the system based on said measurable attributes, and iii) communication means coupled to said DAAM's expert system for transmitting at least a portion of said analysis results;

a control module mounted on the system and in communication with each said DAAM mounted on the system, said control module having i) communication means for the transmission and reception of signals, said control module's communication means receiving said analysis results transmitted from each said DAAM, and ii) a fuzzy logic expert system coupled to said control module's communication means for analyzing said analysis results so-received to generate system status results that summarize the state of relationships between said one or more sub-systems, wherein said control module's communication means transmits at least a portion of said system status results;

a terminal module located remotely with respect to the system and in communication with the system as well as other systems in the group wherein each of the other systems in the group is equipped with their own said at least one DAAM and said control module, said terminal module having i) communication means for the transmission and reception of signals, said terminal module's communication means receiving said system status results transmitted from the system and each of the other systems in the group, and ii) a fuzzy logic expert system coupled to said terminal module's communication means for analyzing said system status results so-received to generate group results that summarize the state of said one or more sub-systems and said relationships between said one or more sub-systems for the group, wherein said terminal module's communication means transmits said group results for use by one or more interested organizations; and each said fuzzy logic expert system incorporating a tool for development thereof, said tool being supplied with a plurality of decision rules indicative of user-supplied consequences based on user-supplied antecedents indicative of said measurable attributes, said tool i) generating a design vector of parameters that defines all antecedent and consequence membership function distributions associated with said plurality of decision rules, ii) configuring a fuzzy inference algorithm with said user-supplied antecedents and said design vector, wherein test consequences are generated thereby, iii) comparing said test consequences with said user-supplied consequences wherein differences therebetween are generated, and iv) minimizing said differences by optimizing said design vector wherein said fuzzy inference algorithm so-configured with said user-supplied antecedents and said design vector so-optimized defines said fuzzy logic expert system.

46. A monitoring system as in claim 45 wherein each said DAAM includes means coupled to said DAAM's expert system for providing baseline data thereto for each of said measurable attributes, said baseline data defining an acceptable level of performance for each of said measurable attributes.

47. A monitoring system as in claim 46 wherein said means for providing said baseline data is a memory device.

48. A monitoring system as in claim 47 wherein said means for providing said baseline data is a neural network trained when the system is known to be operating correctly.

49. A monitoring system as in claim 45 wherein said terminal module's communication means transmits said group results autonomously.

50. A monitoring system as in claim 45 wherein said one or more interested organizations comprises one or more organizations responsible for the one or more of operation, maintenance, monitoring, and manufacturing of the systems in the group and said one or more sub-systems used in the group.

51. A monitoring system for a system, comprising:

at least one data acquisition and analysis module (DAAM) mounted on the system, each said DAAM i) collecting data indicative of measurable attributes of the system, ii) analyzing said data to generate analysis results that identifies the state of one or more sub-systems of the system based on said measurable attributes, and iii) transmitting at least a portion of said analysis results;

a control module mounted on the system and in communication with each said DAAM mounted on the system, said control module i) collecting said analysis results transmitted from each said DAAM, ii) analyzing said analysis results so-collected to generate system status results that identify potential sources of system anomalies based on the state of said one or more sub-systems, and iii) transmitting said analysis results so-collected and at least a portion of said system status results for use by one or more interested organizations.

52. A monitoring system as in claim 51 wherein said one or more interested organizations comprises one or more organizations responsible for the one or more of operation, maintenance, monitoring and manufacturing of the system and said one or more sub-systems used in the system.

53. A monitoring system as in claim 51 wherein each said DAAM, each said control module and said terminal module includes an expert system for performing said analyzing function associated therewith.

54. A monitoring system as in claim 53 wherein each said expert system is a fuzzy expert system.

55. A monitoring system as in claim 51 wherein each said DAAM includes means for providing baseline data for each of said measurable attributes, said baseline data defining an acceptable level of performance for each of said measurable attributes.

56. A monitoring system as in claim 55 wherein said means for providing said baseline data is a memory device.

57. A monitoring system as in claim 55 wherein said means for providing said baseline data is a neural network trained when the structure is known to be operating correctly.

58. A monitoring system as in claim 51 wherein said control module transmits autonomously.

59. A monitoring system as in claim 51 wherein each said DAAM comprises:

programmable means for sampling said data in accordance with user-supplied criteria;

means for providing baseline data for each of said measurable attributes, said baseline data defining an acceptable level of performance for each of said measurable attributes;

a processor coupled to said programmable means and said means for providing said baseline data, said processor analyzing said data so-sampled in relation to said baseline data to generate said analysis results; and communication means coupled to said processor for broadcasting said analysis results.

60. A monitoring system as in claim 59 wherein said processor incorporates an expert system.

61. A monitoring system as in claim 60 wherein said expert system is a fuzzy expert system.

62. A monitoring system as in claim 51 wherein the system is selected from the group consisting of a manufacturing plant, a structure including a building and a bridge, a vehicle, and a patient under medical care.

63. A monitoring system for a system, comprising:

at least one data acquisition and analysis module (DAAM) mounted on a system, each said DAAM having i) a programmable digital interface for collecting data indicative of measurable attributes of the system, ii) an expert system coupled to said programmable digital interface for analyzing said data to generate analysis results that identifies the state of one or more sub-systems of the system based on said measurable attributes, and iii) communication means coupled to said DAAM's expert system for transmitting at least a portion of said analysis results;

a control module mounted on the system and in communication with each said DAAM mounted on the system, said control module having i) communication means for the transmission and reception of signals, said control module's communication means receiving said analysis results transmitted from each said DAAM, and ii) an expert system coupled to said control module's communication means for analyzing said analysis results so-received to generate system status results that summarize the state of relationships between said one or more sub-systems, wherein said control module's communication means transmits at least a portion of said system status results for use by one or more interested organizations.

64. A monitoring system as in claim 63 wherein said one or more interested organizations comprises one or more organizations responsible for the one or more of operation, maintenance, monitoring, and manufacturing of the system and said one or more sub-systems used in the system.

65. A monitoring system as in claim 63 wherein each said expert system is a fuzzy expert system.

66. A monitoring system as in claim 63 wherein each said DAAM includes means coupled to said DAAM's expert system for providing baseline data thereto for each of said measurable attributes, said baseline data defining an acceptable level of performance for each of said measurable attributes.

67. A monitoring system as in claim 66 wherein said means for providing said baseline data is a memory device.

68. A monitoring system as in claim 66 wherein said means for providing said baseline data is a neural network trained when the system is known to be operating correctly.

69. A monitoring system as in claim 63 wherein said control module's communication means transmits said system results autonomously.

70. A monitoring system as in claim 63 wherein the system is selected from the group consisting of a manufacturing plant, a structure including a building and a bridge, a vehicle, and a patient under medical care.

71. A monitoring system for a system, comprising:

at least one data acquisition and analysis module (DAAM) mounted on the system, each said DAAM having i) a programmable digital interface for collecting data indicative of measurable attributes of the system, ii) a fuzzy logic expert system coupled to said programmable digital interface for analyzing said data to generate analysis results that identifies the state of one or more sub-systems of the system based on said measurable attributes, and iii) communication means coupled to said DAAM's expert system for transmitting at least a portion of said analysis results;

a control module mounted on the system and in communication with each said DAAM mounted on the system, said control module having i) communication means for the transmission and reception of signals, said control module's communication means receiving said analysis results transmitted from each said DAAM, and ii) a fuzzy logic expert system coupled to said control module's communication means for analyzing said analysis results so-received to generate system status results that summarize the state of relationships between said one or more sub-systems, wherein said control module's communication means transmits at least a portion of said system status results for use by one or more interested organizations.

72. A monitoring system as in claim 71 wherein each said DAAM includes means coupled to said DAAM's expert system for providing baseline data thereto for each of said measurable attributes, said baseline data defining an acceptable level of performance for each of said measurable attributes.

73. A monitoring system as in claim 72 wherein said means for providing said baseline data is a memory device.

74. A monitoring system as in claim 73 wherein said means for providing said baseline data is a neural network trained when the structure is known to be operating correctly.

75. A monitoring system as in claim 71 wherein said control module's communication means transmits said system results autonomously.

76. A monitoring system as in claim 71 wherein said one or more interested organizations comprises one or more organizations responsible for the one or more of operation, maintenance, monitoring, and manufacturing of the system and said plurality of sub-systems used in the system.

77. A monitoring system as in claim 71 wherein the system is selected from the group consisting of a manufacturing plant, a structure including a building and a bridge, a vehicle, and a patient under medical care.

* * * * *